Jan. 15, 1935.   P. WHITCOMB   1,988,183
SELF LOCKING DIFFERENTIAL
Filed Jan. 3, 1934   3 Sheets-Sheet 2
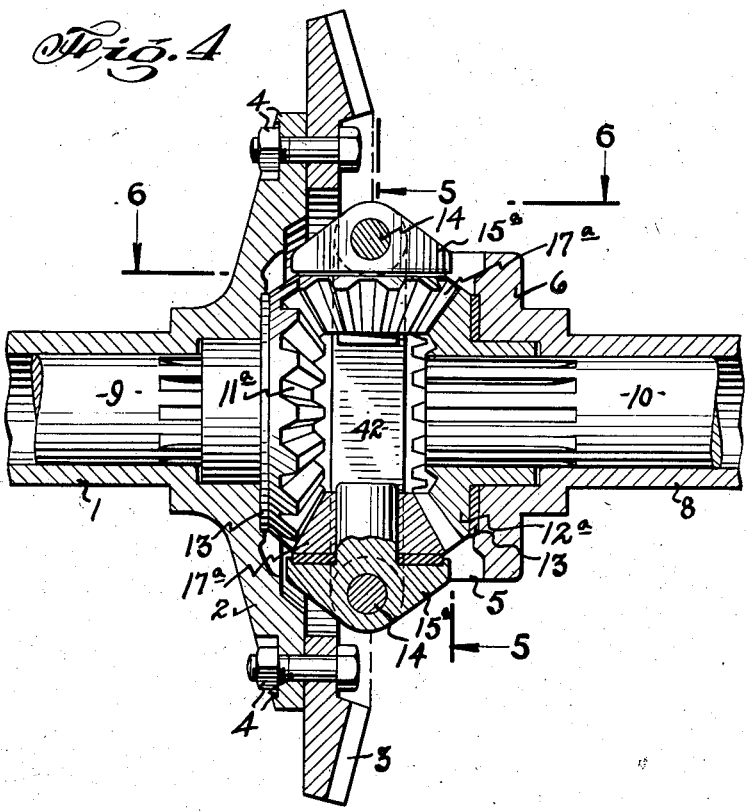
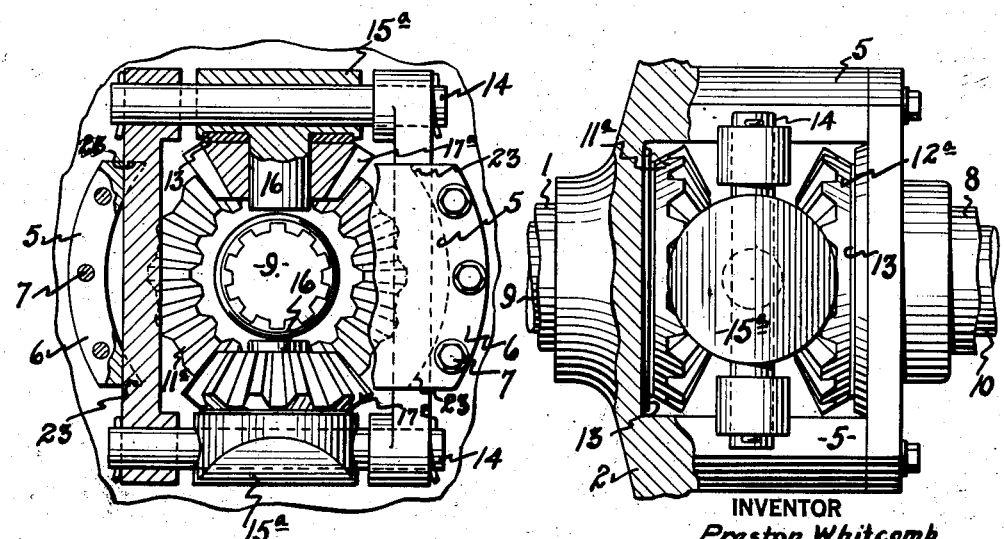
INVENTOR
Preston Whitcomb
BY
ATTORNEYS.

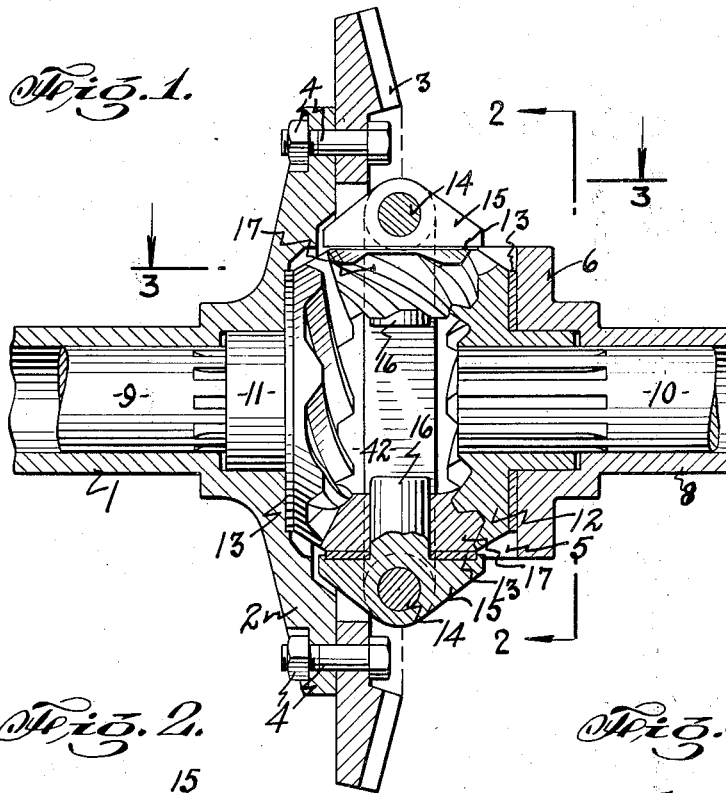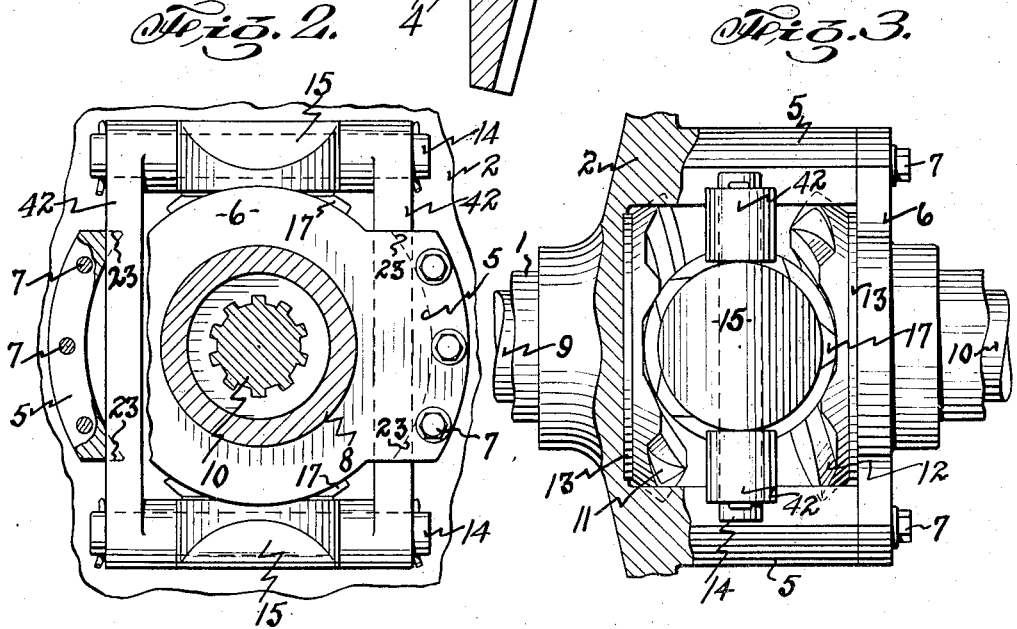

Jan. 15, 1935. P. WHITCOMB 1,988,183
SELF LOCKING DIFFERENTIAL
Filed Jan. 3, 1934    3 Sheets-Sheet 3

INVENTOR
Preston Whitcomb
BY Darby & Darby
ATTORNEYS.

Patented Jan. 15, 1935

1,988,183

UNITED STATES PATENT OFFICE 1,988,183

SELF-LOCKING DIFFERENTIAL

Preston Whitcomb, Kenmore, N. Y., assignor to Manning, Maxwell & Moore, Inc., New York, N. Y., a corporation of New Jersey Application January 3, 1934, Serial No. 705,054

22 Claims. (Cl. 74—315)

This invention relates to improvements in gear structures, and more particularly to improvements in differential gear mechanism of the self-locking type.

An important object of this invention is to provide a structure which utilizes spiral beveled gears having spiral teeth of a high angle when the teeth are many, and of a low pressure angle but of lower spirality when the teeth are few and of a higher pressure angle.

An important object of this invention is to provide a supporting structure for a differential gear mechanism employing spiral beveled gear teeth so that advantage may be taken of the locking characteristics of a mechanism of this type without excessive wear on the parts.

A more general object of the invention is to prolong the life of gear structures by reducing the wear on the parts and particularly on the gears themselves and preventing breakage thereof, as well as of their supporting pins, and to increase their power transmitting efficiency.

A still further object of this invention is to provide, in a differential power transmission mechanism, a carriage for supporting the spiral bevel gears to permit relative movement thereof with respect to the gears driven thereby to take full advantage of the locking characteristics of such a mechanism when the resistance to turning of the driven members is unequal.

A still further object of this invention is to provide a floating supporting carriage of this type for use in connection with straight toothed beveled gears.

These and many other objects, as will appear from the following disclosure, are secured by means of this invention.

This invention resides substantially in the combination, construction, arrangement and relative location of parts, all as will be described in full detail hereinafter.

In the drawings,

Figure 1 is a vertical central cross-sectional view through the mechanism of this invention as employed with spiral beveled gears;

Fig. 2 is a cross-sectional view taken on the line 2—2 of Fig. 1;

Fig. 3 is a cross-sectional view taken on the line 3—3 of Fig. 1;

Fig. 4 is a vertical central cross-sectional view through a modified structure of this invention employing straight toothed beveled gears;

Fig. 5 is a cross-sectional view taken on the line 5—5 of Fig. 4;

Fig. 6 is a cross-sectional view taken on the line 6—6 of Fig. 4;

Figure 7:
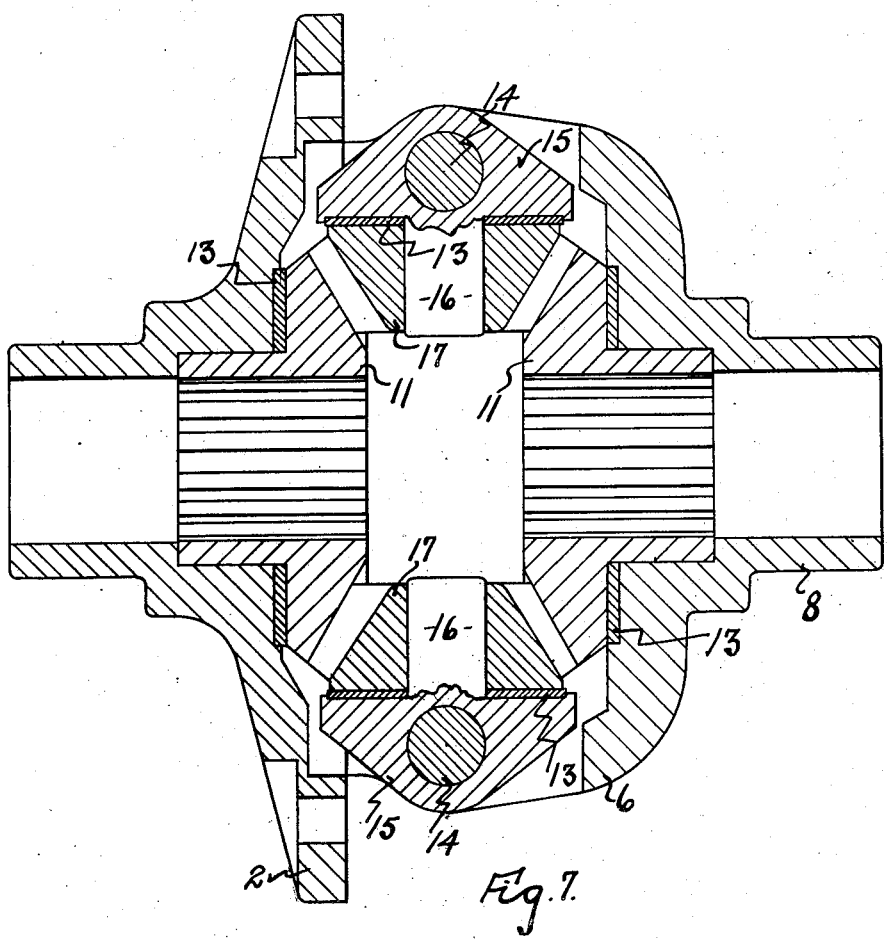
Fig. 7 is a vertical central cross-sectional view through a modified structure in which the carriage is not employed.

Spiral toothed beveled gears are of great value in differential power transmission mechanism, such as for example the type employed on automobiles and similar vehicles. The great advantage of spiral beveled gears as employed in a differential mechanism on a vehicle is that power will be transmitted to one of the wheels even though the other is slipping. This advantage arises from the fact that when the resistance to turning of the wheels is unequal the pinions tend to lock with the side gears, providing a resistance against which the non-slipping wheel may operate so that power will be delivered thereto.

As is well known, the ordinary form of transmission becomes ineffective if one of the wheels loses traction. Obviously a differential mechanism which will still continue to drive through one side when one of the wheels loses traction is of great practical value. Heretofore efforts to employ gears of this type have met with the difficulty that the parts tend to wear out and to shear off both in normal operation, and where the resistance to turning on the side gears is unequal.

The basic object of this invention is to modify the heretofore known structures of this type for the purpose of reducing excessive wear and breakage of the parts. This object is accomplished by the structure which will now be described in detail in connection with the drawings.

The structure includes a cylindrical housing 1 terminating in an end plate or disc 2, to which the driving gear 3 is secured by means of nuts and bolts 4. Power to the transmission housing is delivered through the driving or ring gear 3. The plate or disc 2 is provided in the form of construction illustrated with a pair of extending arms 5 to the free ends of which is bolted the plate 6 by means of the machine bolts 7. The plate 6 is provided with the cylindrical housing extension 8. Enclosed within this housing are the driven shafts 9 and 10 to which, in the case of a vehicle, the wheels are attached. Secured to the inner opposed ends of these shafts are the side gears 11 and 12 which are keyed thereto in any suitable manner.

The extending arms 5 are arcuate in cross section, as illustrated in Fig. 2, to provide adequate space for the side gears 11 and 12. These arms are provided with vertical slots, as indicated at 23, in which the bars or plates 42 of a slidable carriage are mounted. The ends of these bars 42 are connected by means of pivot shafts 14 which are secured in place in any suitable manner. Pivotally mounted on these shafts are the members 15 which are provided with the pins 16, on which the pinions 17 are journaled.

As is clear from Fig. 1, the rear faces of the side gears and pinions are flat, as are the adjacent areas of the housing and members 15. Interposed between these gears and the housing and members 15 are the flat fibre washers 13. This fibre washer, thrust bearing construction is an important feature of a combination of this type, but by itself forms no part of this invention since it is described and claimed in full detail in my copending application Serial No. 690,039, filed September 19, 1933.

The side gears and pinions in this form of structure are preferably of the spiral bevel type, the spiral angle, together with the pressure angle of the teeth, is so made as to displace the pinion from its normal running position when the resistance to turning of the side gears is unequal.

It should be noted that when the loads on the side gears are evenly distributed the thrust pressures due to the spiral and pressure angles of the teeth, taken in the plane of the side gear axis, are equal. Under such conditions the teeth of the planet pinions mesh with a conjugate action with minimum back lash with the teeth of the side gears.

Gears of this type function in a differential and will embody a locking feature when the resistance to turning of the side gears is unequal.

A spiral gear and pinion set of the type described will function efficiently as a differential when the gears and pinions are in their normal position, (i. e. when the apex of the pitch cones of the gears and pinions coincide), but will lock if the axes of the pinions are permitted to tilt in a plane in the plane of the side gear axis when the resistance to turning of said side gears is unequal. Because of the combined thrusts resulting from the spirality and pressure angles of the teeth the pinions have a tendency, due to the inverse ratio of overdrive, to wedge themselves against the reaction of the carrier into the teeth of the side gears when the resistance of said gears to turning is unequal. This results in the locking of the entire gear cluster. It is because of this feature that when employed on a vehicle with one wheel losing traction the power is equally distributed to both.

Under these conditions with the structure just described the journal pins for the planet pinions are mounted on the pivotally supported member 15 whereby pivoted movement about shaft 14 permits the pinions to displace their axes from their normal position as to effect the above operation with a minimum of wear and strain on the parts. The movable carriage on which the planet pinions are journaled permits the planet pinions to adjust themselves in such a manner as to effect an equal distribution of the stresses and strains in the structure to minimize excessive wear and danger of breakage.

The use of the flat fibre thrust bearing washers further reduces wear between the relatively moving parts and aids in uniform distribution of the stress and strains to which the structure is subjected.

In addition, this structure results in a higher power transmission efficiency because of the minimization of frictional losses.

The principles of this invention may be applied to straight toothed beveled gear transmissions. Such a structure is shown in Figs. 4, 5, and 6. All of the similar parts have been given the same reference numerals, and need not be described in full detail here. The first point of differentiation from the previous structure is found in that the side gears 11$^a$ and 12$^a$ and the planet pinions 17$^a$ are of the beveled type, having straight teeth. The pivotally supported members 15$^a$ in this case, as illustrated in Fig. 5, are of less width than the distance between the side bars 42 to permit sliding movement thereof. In the case of a structure of this type when the resistance to turning of the side gears is unequal the members 15 may slide along the shafts 14 under the forces generated and at the same time pins 16 and the pinions 17$^a$ thereon may pivot on the shafts 14. The result is that with a structure of this type the differential may lock so that if one wheel is losing traction power may be transmitted through the other.

Figure 8:
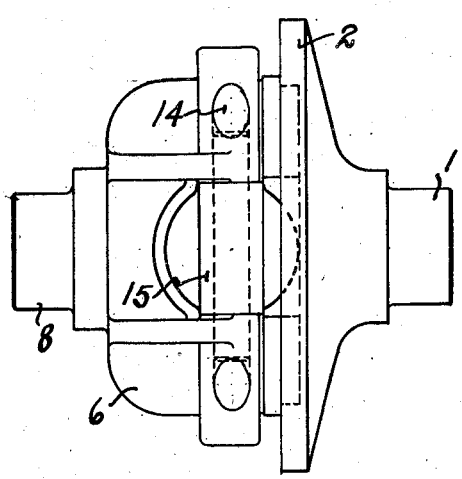
Fig. 8 is a top plan view thereof.

As illustrated in Figs. 7 and 8, the pinion gears may be pivotally mounted directly on the housing without the use of a transversely slidable carriage. This structure may be employed for both the spiral beveled gears and the straight toothed beveled gears. Similar parts have been given the same reference numerals in accordance with the other figures. In this form of the structure, however, the shafts 14 instead of being mounted in a carriage are mounted directly in the housing, as clearly indicated in these figures. The members 15 are pivotaly mounted on the shafts 14 and may or may not be constructed to permit transverse movement thereof on the shafts 14. In the form of structure shown in Figs. 7 and 8 the members 15 are pivotally mounted on the shafts 14 but are not permitted sliding movement thereon. The important distinction between the structure of Figs. 7 and 8 and the previous structures is that the carriage has been eliminated and the shafts 14 are directly secured in the transmission housing.

As will, of course, be apparent to those skilled in the art, this invention may be applied to structures employing two or more planet pinions. For an example of the structure within the scope of this invention, two or more planet pinions may be mounted on pivotally supported members of the type described.

From the above description it will be apparent that this invention resides in certain principles of construction and operation which may be embodied in other physical forms by those skilled in the art, without departure from the scope thereof. I do not, therefore, desire to be strictly limited to this disclosure, as given for purposes of illustration, but rather to the scope of the appended claims.

What I seek to secure by United States Letters Patent is:

1. A differential mechanism as described comprising a housing, a pair of side gears journaled therein, a pair of pinions meshing with said side gears, and a supporting carriage for said pinions movable transversely of the axis of rotation of the side gears.

2. A differential mechanism of the type described comprising a pair of side gears having spiral teeth, a pair of pinions meshing with said gears having spiral teeth, a driven housing in which the side gears are mounted, and a carriage movable radially with respect to the side gears on which said pinions are journaled.

3. A differential mechanism as described comprising a rotatable housing, a pair of beveled gears journaled in said housing, a pair of beveled pinions meshing with said gears, and a carriage movable transversely of the axis of rotation of the side gears on which said pinions are journaled.

4. A differential mechanism as described comprising a rotatable housing, a pair of straight toothed beveled side gears journaled in said housing, a pair of straight toothed beveled pinions meshing with said side gears, and a carriage movable transversely of the axis of rotation of the housing on which said pinions are journaled.

5. A differential mechanism as described comprising a power driven housing, a pair of beveled side gears journaled in said housing, a pair of beveled pinions meshing with said side gears, a carriage slidably mounted in said housing, journal pins pivotally mounted on said carriage, and on which said pinions are journaled.

6. A differential mechanism as described comprising a power driven housing, a pair of beveled side gears journaled in said housing, a pair of beveled pinions meshing with said side gears, a carriage slidably mounted in said housing, journal pins pivotally mounted on said carriage on which said pinions are journaled, said carriage being transversely slidable with respect to the axis of rotation of the side gears.

7. A differential mechanism as described comprising a power driven housing, a pair of beveled side gears journaled in said housing, a pair of beveled pinions meshing with said side gears, a carriage slidably mounted in said housing, journal pins pivotally mounted on said carriage on which said pinions are journaled, all of said beveled gears having spiral teeth.

8. A differential mechanism as described comprising a power driven housing, a pair of beveled side gears journaled in said housing, a pair of beveled pinions meshing with said side gears, a carriage slidably mounted in said housing, journal pins pivotally mounted on said carriage on which said pinions are journaled, said pinions being pivotally mounted in the carriage on axes extending at right angles to the axis of rotation of the side gears.

9. A differential mechanism as described comprising a power driven housing, a pair of beveled side gears journaled in said housing, a pair of beveled pinions meshing with said side gears, a carriage slidably mounted in said housing, journal pins pivotally mounted on said carriage and on which said pinions are journaled, said pinions being pivotally mounted in the carriage on axes extending at right angles to the axis of rotation of the side gears, and said carriage being slidable in a plane at right angles to the axis of rotation of said gears.

10. A differential mechanism as described comprising a power driven housing, a pair of beveled side gears journaled in said housing, a pair of beveled pinions meshing with said side gears, a carriage slidably mounted in said housing, journal pins pivotally mounted on said carriage and on which said pinions are journaled, all of said beveled gears having straight teeth, and said pinions being movable in a plane at right angles to the axis of rotation of the side gears.

11. A differential mechanism as described comprising a rotatable housing, a pair of beveled side gears journaled in said housing, grooves in said housing extending at right angles to the axis of rotation of the side gears, a carriage slidably mounted in said grooves, and a pair of beveled pinions journaled on said carriage.

12. A differential mechanism as described comprising a rotatable housing, a pair of beveled side gears journaled in said housing, grooves in said housing extending at right angles to the axis of rotation of the side gears, a carriage slidably mounted in said grooves, a pair of beveled pinions journaled on said carriage, a pair of members pivotally mounted on the carriage and having journal pins, and a pair of beveled pinions rotatably mounted on said pins.

13. A differential mechanism as described comprising a rotatable housing, a pair of beveled side gears journaled in said housing, grooves in said housing extending at right angles to the axis of rotation of the side gears, a carriage slidably mounted in said grooves, a pair of beveled pinions journaled on said carriage, a pair of members pivotally mounted on the carriage and having journal pins, and a pair of beveled pinions rotatably mounted on said pins, all of said beveled gears having straight teeth and said pivotally mounted members being slidably mounted on the carriage.

14. A differential mechanism as described comprising a rotatable housing, a pair of beveled side gears journaled in said housing, grooves in said housing extending at right angles to the axis of rotation of the side gears, a carriage slidably mounted in said grooves, and a pair of beveled pinions journaled on said carriage, all of said beveled gears having spiral teeth.

15. A differential mechanism as described comprising a rotatable housing, a pair of side beveled gears journaled in said housing, a pair of beveled pinions meshing with said side gears, a slidable carriage on which said pinions are journaled, the opposite face of each of said gears being flat, and a flat thrust bearing washer interposed between the flat outer faces of the side gears and the housing and the flat outer faces of the pinions and the carriage.

16. A differential mechanism as described comprising a rotatable housing, a pair of side beveled gears journaled in said housing, a pair of beveled pinions meshing with said side gears, a transversely slidable carriage on which said pinions are journaled, the opposite face of each of said gears being flat, and a flat fibre thrust bearing washer interposed between the flat outer faces of the side gears and the housing and the flat outer faces of the pinions and the carriage.

17. A differential mechanism as described comprising a rotatable housing, a pair of side beveled gears journaled in said housing, a pair of beveled pinions meshing with said side gears, a slidable carriage on which said pinions are journaled, the opposite face of each of said gears being flat, and a flat fibre thrust bearing washer interposed between the flat outer faces of the side gears and the housing and the flat outer faces of the pinions and the carriage, said gears having spiral teeth.

18. A differential mechanism as described comprising a rotatable housing, a pair of side beveled gears journaled in said housing, a pair of beveled pinions meshing with said side gears, a carriage movable radially with respect to the axis of rotation of the housing on which said pinions are journaled, the opposite face of each of said gears being flat, and a flat fibre thrust bearing washer interposed between the flat outer faces of the side gears and the housing and the flat outer faces of the pinions and the carriage, said gears having straight teeth.

19. A differential mechanism as described comprising a housing, a pair of side gears journaled therein, and a pair of pinion gears journaled in said housing in engagement with said side gears and radially movable with respect thereto.

20. A differential mechanism as described comprising a housing, a pair of side gears journaled in said housing, a pair of pinion supporting members pivotally mounted in the housing, and a pair of pinion gears rotatably supported on said members.

21. A differential mechanism as described comprising a housing, a pair of beveled side gears journaled in said housing, pinion shafts pivotally mounted in said housing, and a pair of pinion gears rotatably supported on said pinion shafts.

22. A differential mechanism as described comprising a housing, a pair of beveled side gears journaled in said housing, a pair of shafts mounted in said housing with their axes at right angles to the axis of rotation of the said gears, pinion supporting members pivotally mounted on said shafts, and a pair of beveled pinions journaled on said members.

PRESTON WHITCOMB.